United States Patent [19]
Nakai et al.

[11] Patent Number: 5,866,670
[45] Date of Patent: *Feb. 2, 1999

[54] PROCESS FOR PREPARING POLYACETAL COPOLYMER

[75] Inventors: Akira Nakai; Kaoru Yamamoto; Eiji Masuda; Hiroyuki Kanai, all of Shizuoka, Japan

[73] Assignee: Polyplastics Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 698,190

[22] Filed: Aug. 15, 1996

[30] Foreign Application Priority Data

Aug. 21, 1995 [JP] Japan .................................. 7-211755
Sep. 27, 1995 [JP] Japan .................................. 7-249300

[51] Int. Cl.$^6$ ...................................................... C08G 4/00
[52] U.S. Cl. ........................ 528/234; 525/337; 525/340; 525/342; 525/366; 525/367; 525/368; 525/369; 525/375; 525/378; 525/379; 525/380; 525/398; 528/230; 528/232; 528/242; 528/243
[58] Field of Search ..................... 528/232, 234, 528/242, 243, 230; 525/337, 340, 342, 366, 367, 368, 369, 375, 378, 379, 380, 398

[56] References Cited

U.S. PATENT DOCUMENTS

| | | | |
|---|---|---|---|
| 4,931,535 | 6/1990 | Yamamoto et al. | 528/230 |
| 4,956,445 | 9/1990 | Yamamoto et al. | 528/230 |
| 5,395,959 | 3/1995 | Weyer et al. | 560/231 |
| 5,500,477 | 3/1996 | Reuschel et al. | 525/398 |

FOREIGN PATENT DOCUMENTS

| | | |
|---|---|---|
| A-52-57285 | 5/1977 | Japan . |
| A-57-80414 | 5/1982 | Japan . |
| A-58-167608 | 10/1983 | Japan . |
| A-62-285909 | 12/1987 | Japan . |
| A-63-27519 | 2/1988 | Japan . |
| A-2-26813 | 10/1990 | Japan . |

*Primary Examiner*—Judy M. Reddick
*Attorney, Agent, or Firm*—Nixon & Vanderhye P.C.

[57] ABSTRACT

A process for producing a polyacetal copolymer, which is extremely heat-stable and is extremely reduced in the quantity of unstable terminals even in a high polymerization yield in which trioxane as the principal monomer, comprises copolymerization of trioxane as the principal monomer with a cyclic ether or cyclic formal having at least one carbon-to-carbon bond as the comonomer by using a specific heteropoly-acid or acid salt thereof as a polymerization catalyst until the content of the remaining monomers is lowered to at most 10% by weight based on all the monomers fed, adding 0.01 to 10% by weight, based on the resulting crude polymer, of a solution containing a catalyst deactivator, or contacting a basic gas as the deactivator to deactivate the catalyst, and subjecting the crude polymer as such to heat melting treatment without washing thereof.

16 Claims, No Drawings

5,866,670

PROCESS FOR PREPARING POLYACETAL COPOLYMER

BACKGROUND OF THE INVENTION

1. Field of the Invention

The present invention relates to a process for producing a polyacetal copolymer. In particular, it relates to an improved process for producing polyacetal copolymer being excellent in the qualities such as heat stability comprising simple steps, wherein the principal monomer is copolymerized with a comonomer copolymerizable therewith using a heteropoly-acid or an acidic salt thereof as the polymerizing catalyst.

2. Description of the Related Art

Conventionally, processes for producing cationic copolymers comprising trioxane as the principal monomer and a cyclic ether or cyclic formal having two or more vicinal carbon atoms as the comonomer have been known as the process for producing polyacetal copolymers. The cationic activating catalysts used as catalysts for these copolymerizations include Lewis acids such as halides of boron, tin, titanium, phosphorus, arsenic and antimony, e.g., boron trifluoride, tin tetrachloride, titanium tetrachloride, phosphorus pentachloride, phosphorus pentafluoride, arsenic pentafluoride and antimony pentafluoride, and compounds such as complexes or salts of them; protonic acids such as perchloric acid; protonic acid esters such as esters of perchloric acid with lower aliphatic alcohols, e.g., tert-butyl perchlorate; protonic acid anhydrides such as mixed acid anhydrides of perchloric acid and lower aliphatic carboxylic acids, e.g., acetyl perchlorate; and trimethyloxonium hexafluorophosphate, triphenylmethyl hexafluoroarsenate, acetyl tetrafluoroborate, acetyl hexafluorophosphate and acetyl hexafluoroarsenate.

Among them, boron trifluoride and coordinate compounds of boron trifluoride with organic compounds such as ethers are the most conventional as catalysts for copolymerizing trioxane as the principal monomer with a comonomer and widely used industrially.

However, there have been problematic that conventionally used polymerization catalysts such as boron trifluoride series compounds are required in relatively large quantities (for example, 40 ppm or more based on the whole monomers), that the polymerization degrees of the resulting polymers are limited since the deactivating treatment of the catalyst is not sufficiently completed, even though the deactivating treatment is applied, and the decomposition is accelerated by remaining of substances originated from the catalyst after polymerization, and that the resulting polymers contain unstable terminal moieties in considerable amounts requiring complicated steps for stabilization thereof.

That is, in a process for copolymerizing trioxane by means of such conventional catalysts as described above, a deactivation of the catalysts after polymerization is important. While the deactivation thereof is insufficient, it accelerates a decomposition of a resulting polymer and largely causes an obstruction against a stability of the resulting polymer in later steps. Accordingly, when a boron trifluoride and the like are used as a catalyst, such very complicated steps that in order to sufficiently deactivate the catalyst, for example, a lot of a deactivator solution is added to the product obtained by the polymerization, the product is sufficiently washed to remove residual monomers and residues originated from the catalyst, and the deactivator solution is separated and dried, or the monomers have to be recovered from the washing solution. Such complicated steps are not preferred from an economical point of view.

Moreover, in order to eliminate complexity brought about by such deactivation treatment of catalysts, a method is proposed in which an addition amount of a deactivator solution is decreased and washing of a crude polymer is omitted (for example, JP-A-52-57285, JP-A-57-80414, JP-A-62-285909, and JP-A-63-27519). A method for deactivating the catalyst by contacting a gaseous deactivator to a resulting copolymer is further proposed (for example, JP-A-58-167608 and JP-A-2-263813). In such methods, however, such generally known polymerization catalysts as boron trifluoride series catalysts can not sufficiently be deactivated, and therefore it is extremely difficult to obtain polymers having a good heat stability. In particular, an increase in a polymerization yield can reduces the necessity for recovery and washing of monomers, but it makes a resulting polymer further unstable and requires a complicated stabilization treatment in a later step. Therefore, it does not result in simplification of the steps and restricts the stability of the products. Accordingly, it is not preferred in terms of quality.

DISCLOSURE OF THE INVENTION

SUMMARY OF THE INVENTION

In view of such existing situation, an object of the present invention is to provide a thermally stable polyacetal copolymer having unstable terminal sites even at a high polymerization yield by the process comprising so simple steps without washing step wherein the catalyst can easily be completely deactivated by the small amount of a deactivator solution or by contacting with a basic gas.

The present inventors have studied to solve the problem as described above and found that the catalyst can be easily and definitely deactivated by using a deactivator even though the catalyst has high polymerization activity as the feature when a heteropoly-acid or acidic salt thereof is used, and accompanied the present invention.

Furthermore, the present inventors have studied catalysts and corresponding deactivating methods and found that the catalyst can be easily and definitely deactivated by contacting a gaseous deactivator even though the catalyst has high polymerization activity as the feature when a heteropoly-acid or acidic salt thereof is used, and accompanied the present invention.

In other words, the present invention relates to a process for producing a polyacetal copolymer by copolymerizing a trioxane as the principal monomer with a cyclic ether or cyclic formal having at least one carbon-to-carbon bond as the comonomer, comprises steps of; conducting the copolymerization in the presence of a heteropoly-acid represented by the formula (1) or an acidic salt thereof as the polymerization catalyst; deactivating the catalyst by adding of 0.01 to 10% by weight of a solution containing a deactivating agent of the catalyst based on a resulting crude polymer after conducting the amount of a remaining monomer to be 10% by weight or below based on the whole fed monomers; and applying a heat melting treatment to the crude polymer without washing thereof:

$$H_x[M_m.M'_nO_l].yH_2O \quad (1)$$

(wherein, M represents at least one central element selected by P or Si; M' represents at least one coordinating element selected from the group consisting of W, Mo and V; l is 10 to 100; m is 1 to 10; n is 6 to 40; x is an integer of at least 1; and y is 0 to 50).

Further, the present invention relates to a process for producing a polyacetal copolymer by copolymerizing a trioxane as the principal monomer with a cyclic ether or cyclic formal having at least one carbon-to-carbon bond as the comonomer, comprises steps of; conducting the copolymerization in the presence of a heteropoly-acid represented by the formula (1) or an acidic salt thereof as the polymerization catalyst; deactivating the catalyst by contacting a basic gas as the deactivator to the resulting polymer; and applying a heat melting treatment to the crude polymer without washing thereof:

$$Hx[Mm.M'nOl].yH_2O \qquad (1)$$

(wherein, M represents at least one central element selected by P or Si; M' represents at least one coordinating element selected from the group consisting of W, Mo and V; l is 10 to 100; m is 1 to 10; n is 6 to 40; x is an integer of at least 1; and y is 0 to 50).

The present invention is characterized in that: a thermally stable polyacetal copolymer having very few unstable portions can be obtained even if the polymer is heated and molten as it is by the process in which the catalyst has a very high polymerization activity providing a high polymerization yield in a very small amount of the catalyst by using particularly a heteropoly-acid or acidic salt thereof as the polymerization catalyst, in addition, the catalyst can be completely and effectively deactivated by using a very small amount of a deactivator solution, or by only contacting a basic gas after the polymerization; and in which residues originated from the catalyst do not exhibit any harm. Furthermore, a washing step is not required in the process. That is, the process has a specific effect against the case using conventional boron trifluoride series catalysts and the like, in such case, the deactivation of the catalyst is not sufficiently, in particular, the catalysts tends to be remained as being active while the deactivation is carried out by contacting with a deactivator, moreover, harmful actions such as decomposition caused by substances originated from the catalysts are difficult to avoid even after deactivation thereof.

The present invention will now be described in detail.

DETAILED DESCRIPTION OF THE INVENTION

The "heteropoly-acid" as a copolymerization catalyst, by which the present invention is characterized, is a generic term for polyacid residues which are formed by condensing by dehydration two or more kind of oxygen acids one another. The heteropoly-acid contains a mono- or polynuclear complexion wherein a specific hetero element is present in the center thereof and the oxygen acid residues are bonded one another through oxygen atoms. Such a heteropoly-acid can be usually represented by the formula (1) described above.

In the heteropoly-acid which is particularly effective as the copolymerization catalyst of the present invention, the central element (M) in the composition formula described above is composed of one or two kinds of elements selected from among P and Si, and the coordinate element (M') is composed of at least one element selected from among W, Mo and V, particularly preferably W or Mo.

Further, acidic salts of heteropoly-acids each having a form, in which any of various metals substitutes for a part of H's (hydrogen atoms) in the formula (1), can also be used as the catalyst of the present invention.

Specific examples of these heteropoly-acids include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid and silicomolybdotungstovanadic acid. Among them, preferred are silicomolybdic acid, silicotungstic acid, phosphomolybdic acid and phosphotungstic acid.

The amount of the heteropoly-acid or the acidic salt thereof used as a polymerization catalyst for monomers comprising mainly trioxane is varied depending on the kind thereof and can suitably be changed to control the polymerization. In general, it falls in a range of from 0.05 to 100 ppm, preferably from 0.1 to 50 ppm based on the total amount of the monomers to be polymerized. The use amount of preferably 0.1 to 10 ppm suffices heteropoly-acids acting very strongly such as phosphomolybdic acid, phosphotungstic acid, silicomolybdic acid and silicotungstic acid. The copolymerization which can be carried out with the catalyst in such the small amount is effective for reducing undesirable reactions such as breakage of the principal chain of the copolymer and depolymerization caused by the catalyst to narrow ranges; and inhibiting to produce unstable terminal groups such as formate terminal group and hemiacetal terminal group, and advantageous from an economical viewpoint.

In the present invention, it is preferred in terms of carrying out the reaction uniformly to use the catalyst described above by diluting with an inert solvent exerting no adverse effects on the polymerization and adding to the monomer. Examples of diluents include ethers such as organic solvent in which the heteropoly-acid or the acidic salt thereof can be dissolved, for example, n-butylether is preferably used, but it is not limited by this. It is also preferable method that the diluent as the solution in which one part of or all prescribed amount of molecular weight controlling agent, comonomers described below or the like is previously dissolved is added to the polymer system.

Trioxane which is a cyclic trimer of formaldehyde is used as the principal monomer of the present invention.

Further, the comonomer used in the present invention includes cyclic ether or cyclic formal having at least one adjacent carbon-to-carbon bond, and any known comonomers used for conventional copolymerizations with trioxane can be used.

As typical examples of said cyclic ether or cyclic formal, 1,3-dioxolane, diethyleneglycol formal, 1,4-butanediol formal, 1,3-dioxane, ethyleneoxide, propyleneoxide, epichlorohydrin are cited. Further, cyclic esters, for example, β-propiolactone, and vinyl compounds, for example, styrol are used. Also, compounds having two or more polymerizable cyclic ether groups or cyclic formal groups such as alkylene-diglycidyl ether or diformal can be used as a comonomer to form a branched or cross-linked molecular structure in the copolymer. It includes, for example, butanediol dimethylideneglyceryl ether and butanediol diglycidyl ether. Particularly, cyclic ethers or cyclic formals such as 1,3-dioxolane, diethyleneglycol formal, 1,4-butanediol formal and ethyleneoxide are preferred. The comonomer in the present invention is used in an amount of 0.1 to 20% by mole, preferably 0.2 to 10% by mole based on the molar amount of trioxane. When the amount is less than 0.1% by mole, the unstable ends are increased to deteriorate the stability. While when it exceeds 20% by mole, the resulting copolymer is soft and has a lower melting point, unfavorably.

In the polymerization process of the present invention, in order to control a polymerization degree according to objects, publicly known chain transfer agents, for example, linear acetals having a low molecular weight, such as methylal can be added. Also, the polymerization reaction system remains preferably in the condition that impurities having active hydrogen, for example, water, methanol, formic acid and the like are not substantially present, for example, 10 ppm or less each.

The polymerization of the present invention can be conducted in the similar facilities and processes as those for conventional copolymerizations using trioxane. That is, either a batch system or a continuous system can be applied. A method in which a liquid monomer is used thereby to obtain a copolymer in the form of a solid powdery lumb with proceeding of the polymerization is generally used.

With respect to a polymerization apparatus used in the present invention, a reactor equipped with a stirrer usually employed can be used for a batch system, while for a continuous system, continuous polymerization apparatuses for trioxane which have so far been proposed, such as a cokneader, a biaxial screw type continuous extruding-mixer, a biaxial paddle type continuous mixer and others, can be used. Further, two or more types of the polymerization equipments can be used in combination.

The polymerization is carried out at temperatures falling in a range of 60° to 120° C., particularly preferably 65° to 100° C.

In the present invention, the unreacted monomers remaining after the polymerization have to account for 10% by weight or less, preferably 5% by weight or less, and more preferably 3% by weight or less. This is because the present invention has a principal object that the polymerization product is not washed, and therefore an increase in the residual monomers is not preferred. In general, a polymerization degree can be raised to a fixed value or more in order to reduce unreacted monomers. In the case of the present invention, this can readily be achieved by suitably controlling the amount of the catalyst used and the polymerization time (residence time in a continuous system). In particular, the catalyst of the present invention has a high activity, and therefore a reduction in the unreacted monomers can be achieved in relatively short time even in the small amount of the catalyst.

Further, after finishing the polymerization, a part of the residual monomers may be removed by vaporizing to adjust the residual monomer amount to a prescribed value.

Next, a prescribed amount of a solution containing a deactivator for the catalyst is added and mixed with a crude polymer which is obtained after finishing the copolymerization and in which the residual monomers are reduced to 10% by weight or less to deactivate the catalyst.

In the present invention, the deactivator can be added in an amount sufficient to neutralize and deactivate the catalyst, and the deactivator is added preferably in the form of a deactivator solution prepared by dissolving or dispersing the deactivator in water or an organic solvent.

In this case, the addition amount of the deactivator solution is 0.01 to 10% by weight, preferably 0.05 to 5% by weight, particularly preferably 0.1 to 3% by weight based on the weight of the crude polymer. The present invention is characterized in that the amount of the deactivator solution is very small. It is an insufficient amount to soak the crude polymer to be turned into a slurry but well stirring and mixing with the crude polymer makes it possible to sufficiently deactivate the catalyst even in such small amount, which is contributed as well by the characteristics of the specific catalyst used in the present invention. The present invention is characterized as well in that even if the products originated from the catalyst remain after deactivation, the polyacetal copolymer which is stable even if it is molten by heating as it is can be obtained without bringing about any adverse effects such as an acceleration of the decomposition of the polymer and separating and washing away the deactivator solution.

All of publicly known basic substances are effective as the deactivator in the present invention as is the case with conventional boron trifluoride catalysts and include, for example, ammonia, various amine compounds, trivalent phosphorus compounds, or oxides, hydroxides, organic acid salts or inorganic acid salts of alkaline metals or alkaline earth metals. These deactivators are added in the form of an aqueous solution or an organic solvent solution in an amount falling in a range of not more than a fixed amount. The amine compounds include primary, secondary and tertiary aliphatic amines and aromatic amines, for example, methylamine, dimethylamine, trimethylamine, ethylamine, diethylamine, triethylamine, butylamine, dibutylamine, tributylamine, and alcohol amines corresponding to them (for example, triethanolamine) aniline, diphenylamine, heterocyclic amines, and hindered amines (various piperidine derivatives)

The trivalent phosphorous compounds include, for example, triphenylphosphine.

The alkaline metal or alkaline earth metal compounds include oxides, hydroxides, carbonates, bicarbonates, and inorganic weak-acid salts such as phosphates, borate and silicates, organic acid salts such as acetates, oxalates, formates, benzoates, terephthalates, isophthalates, phthalates, and aliphatic acid salts, alkoxides such as methoxide, ethoxide, n-butoxide, sec-butoxide, and tert-butoxide, and phenoxides of alkaline metals or alkaline earth metals. Among them, hydroxides, carbonates and aliphatic acid salts are preferably used. The alkaline metal or alkaline earth metal components include lithium, sodium, potassium, cesium, magnesium, calcium, strontium, and barium. Among them, lithium, sodium, potassium, magnesium, and calcium are preferably used. To describe concretely, potassium hydroxide, magnesium hydroxide, sodium carbonate, calcium acetate, calcium stearate, and calcium 12-hydroxystearate are particularly preferred.

Water or organic solvents are used as the solvent for dissolving the deactivator. The organic solvents include alcohols such as methanol and ethanol; ketones such as ethyl ketone and acetone; aromatic compounds such as benzene, toluene and xylene; and saturate hydrocarbons such as cyclohexane, n-hexane and n-heptane. Water is particularly preferred.

Although a method for adding the deactivator solution described above to the crude polymer is not specifically limited, in order to make dispersion and contact thereof effective, the solution is preferably sprayed on the crude polymer or sufficiently stirred and mixed after adding the solution.

Temperatures for the deactivation treatment are 0° to 140° C., preferably 20° to 120° C., more preferably 40° to 100° C. In particular, a part of the unstable sites of the crude polymer can be removed by applying the treatment to the crude polymer at relatively high temperatures. Especially when a solution of an amine compound and an ammonia aqueous solution are used as the deactivator, a notably high effect thereof can be expected.

In the present invention, the crude polymer after the copolymerization reaction is contacted with a basic gas as a deactivator, thereby the catalyst can also be deactivated.

In the present invention, the amount of the basic gas can be an amount sufficient to neutralize and deactivate the catalyst, and is preferably a ten times or more as much amount as a catalyst amount used.

The basic gas used in the present invention includes ammonia or amine compounds. Preferred amine compounds are represented by the formula $R_1NH_2$, $R_1R_2NH$ or $R_1R_2R_3N$ (wherein, $R_1$, $R_2$ and $R_3$ each represents an alkyl group or alcohol group having 4 or below of carbon atoms).

The present invention is characterized in contacting the deactivator with the resulting polymer in a gaseous form, and therefore compounds having a relatively low molecular weight and a low boiling point are preferred for the amine compounds described above. $R_1$, $R_2$ and $R_3$ have particularly preferably a carbon number of 2 or less. As will be described later, amines having a relatively high boiling point can be contacted with the polymer in a gaseous form by diluting the amines with a carrier gas.

Examples of the amine compound include methylamine, dimethylamine, trimethylamine, ethylamine diethylamine, triethylamine butylamine dibutylamine, tributylamine, and corresponding aldoholamines (for example, trimethanolamine). Among them, methylamine, dimethylamine, and trimethylamine are particularly preferred.

The basic gases described above may be used alone or in the form of mixed gases prepared by diluting with other carrier gases to be contacted with the resulting polymer. The carrier gas is not specifically limited and is preferably an inner gas. It maybe, for example, a nitrogen gas and other organic gases.

A method for contacting the basic gas with the crude polymer is not specifically limited as long as it is a method in which the basic gas described above can sufficiently be contacted with particles of the resulting copolymer. Any of a method in which a crude polymer is well stirred and mixed under the basic gas atmosphere; a method in which a basic gas is blown in countercurrently against a crude copolymer; and a method in which a basic gas is passed through the particles in the crude polymer layer while circulating the basic gas can be applied.

In the present invention, the crude polymer which has been contacted with the basic gas for the deactivation treatment for the catalyst is then subjected to a heat-melting treatment as it is, i.e., without washing.

The heat-melting treatment is carried out preferably in the presence of a stabilizer. The stabilizer may be added and blended at an optional period of after the polymerization and before the heat-melting treatment or in the middle of the heat-melting treatment. In the present invention, it is also preferable that the desired stabilizer is added after deactivating the crude polymer or at the same time of the deactivation treatment if necessary.

In the preferred embodiment, the heat-melting treatment is carried out while adding a small amount (for example, 0.1 to 5% by weight) of water.

Also, in subjecting the catalyst to a deactivation treatment, the crude polymer is preferably of fine particles, and therefore a polymerization reactor has preferably a function to sufficiently pulverize a block polymer. Also, after pulverizing separately the reaction product obtained after polymerization by means of a crusher, the deactivator maybe added. Further, pulverization and stirring may be carried out at the same time in the presence of the deactivator.

The particle size of the crude polymer in the deactivation treatment is 3 mm or less, preferably 2 mm or less, and more preferably 1 mm or less, which accounts for at least 90% or more.

With respect to the stabilizer, the preceding compounds exemplified as the deactivators have a function as a stabilizer component as they are in many cases. It is important to add stabilizers other than these compounds including compounds publicly known as the stabilizers for conventional polyacetal resins, for example, various hindered phenol series antioxidants. Further, various nitrogen-containing compounds, metal oxides, and aliphatic acid salts may be added in combination.

The hindered phenol series antioxidants include, for example, 2,6-di-t-butyl-4-methylphenol, triethylene glycol-bis[3-(3-t-butyl-5-methyl-4-hydroxyphenyl)propionate], 1,6-hexanediol-bis-[3-(3,5-di-t-butyl-4-hydroxyphenyl) propionate], tetrakis[3-(3,5-di-t-butyl-4-hydroxyphenyl) propionate]methane, N,N'-hexamethylenebis(3,5-di-t-butyl-4-hydroxyhydrocinamide, 2-t-butyl-6-(3'-t-butyl-5'-methyl-2'-hydroxybenzyl)-4-methylphenylacrylate, and 3,9-bis[2-{ (3-t-butyl-4-hydroxy-5-methylphenyl)propionyloxy}-1,1'-dimethylethyl]-2,4,8,10-tetraoxaspiro[5,5]-undecane. One part or all amount of these hindered phenol series antioxidants can previously be added to the trioxane or comonomer before the polymerization thereof to be presented at the polymerization.

The nitrogen-containing compounds include dicyandiamide, melamine or derivatives thereof, urea or derivatives thereof, benzotriazole series compounds, piperidine series compounds (hindered amines), various polyamides or copolymers thereof (for example, nylon 6, 12, 6/12, 6/66/610, and 6/66/610/12).

The metallic aliphatic acid salts include calcium salts or magnesium salts of higher fatty acids.

Further, various additives, for example, fillers such as glass fiber, crystallization accelerators (nuclear agents), and releasing agents may be blended at this stage according to necessity.

The crude polymer blended with the deactivator for the catalyst is then subjected to a heat-melting treatment in the present invention.

In the heat-melting treatment carried out in the present invention, the temperatures fall in a range of not lower than the melting point of the resulting polymer and up to 250° C., particularly preferably not lower than the melting point and up to 230° C. While the temperatures higher than 250° C., the decomposition of the polymer is caused, and therefore it is not preferred. A heat treatment apparatus is not specifically limited. The apparatuses having a function to knead the molten polymer and a vent function are required and include, for example, a single axis or multi-axis continuous extrusion kneader and co-kneader having at least one vent hole.

In the present invention, the polymerization catalyst is further deactivated completely in this melt-kneading treatment, and the mixed deactivator solution or basic gas or an adsorbent thereof as the deactivator accelerates the decomposition and separation of unstable terminal sites, which are removed from a vent member together with water added as the deactivator, other solvents, the residual monomers and the other volatile substances, whereby the pellets of the stable polyacetal copolymer can be obtained. It is a matter of course that in order to obtain that a suction by reducing pressure of the bent hole is needed.

EXAMPLES

Examples of the present invention will now be described, though the present invention is not limited thereto. The terms and the determination methods shown in the examples and comparative examples are defined as follows:

% and ppm: all shown on the basis of weight

Residual Monomer: the ratio (% by weight) of the residual monomer to the whole monomers supplied Melt index (MI):

Melt indexes (g/10 min) determined at 190° C. are shown. The melt index was evaluated as the characteristic value corresponding to the molecular weight of the copolymer. That is, the lower the MI, the higher the molecular weight. In the determination of the melt index.

Decomposition ratio with an alkali (amount of the unstable moieties):

1 g of the copolymer prepared by crushing the pellets was put into 100 ml of a 50% aqueous methanol solution containing 0.5% of ammonium hydroxide and the resulting mixture was heated at 180° C. for 45 minutes in a sealed vessel. Then, the amount of formaldehyde formed by the decomposition of the copolymer and dissolved in the solution was determined. The ratio (% by weight) of the amount of the formaldehyde to the amount of the copolymer is shown below.

Weight-loss ratio on heating:

5 g of the copolymer pellet was heated at 230° C. for 45 minutes in the air. The weight loss ratio on heating was determined.

Examples A-1 to A-14 and Comparative Examples A-1 to A-3

A continuous type blend reactor having a cross-section formed by causing two circles to partially overlap each other and equipped with a barrel having a jacket for passing a heat transfer medium (cooling medium) in the outside thereof and two rotational axes having a lot of paddles for stirring and propelling in the inside thereof in a longitudinal direction was used. Warm water of 70° C. was passed through the jacket, and two rotational axes were rotated at a fixed rate. Trioxane containing 3.5% of the comonomer shown in Table 1 and 700 ppm of methylal as chain transfer agent were continuously fed to one end thereof, and a heteropoly-acid catalyst (solution prepared by dissolving it in di-n-butyl ether) was continuously added to the same place at the same time in an amount specified in Table 1 based on the whole monomers.

Then, after the reaction product discharged from a discharge port of the polymerization reactor was continued to be further polymerized (a part of the polymer was sampled to determine the amount of the residual monomers) by means of an another apparatus, a deactivator solution shown in Table 1 was added and, at the same time, the reaction product was pulverized by means of a crusher, followed by stirring at 60° C. for 30 minutes (particles having a diameter of 2 mm or less accounts for 90% or more). Then, 0.5% of tetrakis-[methylene-3-(3,5-di-t-butyl-4-hydroxyphenyl) propionate]methane and 0.2% of melamine were added as stabilizers and stirred in a Hoenshell mixer for 5 minutes. Then, the reaction mixture was melt, kneaded and extruded by means of a dual axis extruder equipped with a vent at 210° C. and a vacuum degree of 5 mmHg in a vent member to prepare pellets. The pellets were dried and then subjected to determinations of MI, a heat decomposition rate, and a heat-weight loss rate. The results thereof are given in Table 1.

For the sake of comparison, the same procedure was repeated as well for a case where boron trifluoride butyl etherate was used as the catalyst (Table 2).

Examples B-1 to B-14 and Comparative Examples B-1 and B-2

A continuous type blend reactor having a cross-section formed by causing two circles to partially overlap each other and equipped with a barrel having a jacket for passing a heat transfer medium (cooling medium) in the outside thereof and two rotational axes having a lot of paddles for stirring and propelling in the inside thereof in a longitudinal direction was used. Warm water of 70° C. was passed through the jacket, and two rotational axes were rotated at a fixed rate. Trioxane containing 3.5% of the comonomer shown in Table 3 and 700 ppm of methylal as chain transfer agent were continuously fed to one end thereof, and a heteropoly-acid catalyst (solution prepared by dissolving it in di-n-butyl ether) was continuously added to the same place at the same time in an amount specified in Table 3 based on the whole monomers.

Then, after the reaction product discharged from a discharge port of the polymerization reactor was continued to be further polymerized (a part of the polymer was sampled to determine the amount of the residual monomers) by means of an another apparatus, a deactivator solution shown in Table 3 was added, and then the reaction product was pulverized by means of a crusher (particles having a diameter of 2 mm or less accounts for 90% or more), followed by contacting with the basic gas specified in Table 3 at 80° C. for 30minutes. Then, 0.5% of tetrakis-[methylene-3-(3,5-di-t-butyl-4-hydroxyphenyl)propionate]methane and 0.2% of melamine were added as stabilizers and blended with the reaction mixture and stirred in a Hoenshell mixer for 5 minutes. Then, the reaction mixture was melt, kneaded and extruded by means of a dual axis extruder equipped with a vent at 210° C. and a vacuum degree of 5 mmHg in a vent member to prepare pellets. The pellets were dried and then subjected to determinations of MI, a heat decomposition rate, and a heat-weight loss rate. The results thereof are given in Table 3.

For the sake of comparison, the same procedure was repeated as well for a case where boron trifluoride butyl etherate was used as the catalyst (Table 4).

TABLE 1

|  | Polymerization catalyst | | | Amount of residual monomer after polymerization (% based on the whole monomer) |
|---|---|---|---|---|
|  | Kind | Amount (ppm based on the whole monomer) | Comonomer | |
| Ex. A-1 | phosphomolybdic acid | 3 | 1,3-dioxolane | 2.5 |
| Ex. A-2 | phosphomolybdic acid | 3 | 1,3-dioxolane | 2.5 |

TABLE 1-continued

| | | | | |
|---|---|---|---|---|
| Ex. A-3 | phosphomolybdic acid | 3 | 1,3-dioxolane | 2.5 |
| Ex. A-4 | phosphomolybdic acid | 3 | 1,3-dioxolane | 2.5 |
| Ex. A-5 | pbosphomolybdic acid | 3 | 1,3-dioxolane | 2.5 |
| Ex. A-6 | pbosphomolybdic acid | 3 | 1,3-dioxolane | 2.5 |
| Ex. A-7 | pbosphomolybdic acid | 3 | 1,3-dioxolane | 2.5 |
| Ex. A-8 | phosphomolybdic acid | 3 | 1,3-dioxolane | 2.5 |
| Ex. A-9 | phosphomolybdic acid | 2 | 1,3-dioxolane | 4.8 |
| Ex. A-10 | silicotungstic acid | 3 | 1,3-dioxolane | 3.0 |
| Ex. A-11 | silicomolybdic acid | 4 | 1,3-dioxolane | 2.0 |
| Ex. A-12 | phosphotungstlc acid | 10 | 1,3-dioxolane | 5.0 |
| Ex. A-13 | phosphomolybdic acid | 3 | 1,4-butanediol formal | 2.8 |
| Ex. A-14 | phosphomolybdic acid | 3 | diethyleneglycol formal | 3.6 |

| | Deactivator solution | | Characteristic of extruded pellet | | |
|---|---|---|---|---|---|
| | | Solvent | | | |
| | Deactivator | (% of concentration of deactivator) | Addition amount (% based on crude polymer) | MI (g/10 min.) | Decomposition rate with alkali (%) | Weight-loss on heating (%) |
| Ex. A-1 | trimethylamine | water (20) | 1.5 | 7.8 | 0.51 | 0.33 |
| Ex. A-2 | trimethylamine | water (20) | 0.2 | 8.5 | 0.61 | 0.42 |
| Ex. A-3 | trimethylamine | water (20) | 5 | 7.6 | 0.48 | 0.28 |
| Ex. A-4 | trimethylamine | benzene (5) | 1.5 | 8.8 | 0.62 | 0.41 |
| Ex. A-5 | trimethylamine | water (20) | 1.5 | 8.4 | 0.65 | 0.37 |
| Ex. A-6 | ammonia | water (20) | 1.5 | 7.9 | 0.49 | 0.32 |
| Ex. A-7 | calcium hydroxide | water (0.1) | 7 | 8.8 | 0.68 | 0.48 |
| Ex. A-8 | sodium carbonate | water (1) | 5 | 7.9 | 0.50 | 0.34 |
| Ex. A-9 | trimethylamine | water (20) | 1.5 | 7.7 | 0.54 | 0.36 |
| Ex. A-10 | trimethylamine | water (20) | 1.5 | 8.5 | 0.60 | 0.42 |
| Ex. A-11 | trimethylamine | water (20) | 1.5 | 8.3 | 0.55 | 0.40 |
| Ex. A-12 | trimethylamine | water (20) | 1.5 | 9.1 | 0.72 | 0.49 |
| Ex. A-13 | trimethylamine | water (20) | 1.5 | 8.0 | 0.55 | 0.41 |
| Ex. A-14 | trimethylamine | water (20) | 1.5 | 8.2 | 0.51 | 0.35 |

TABLE 2

| | Polymerization catalyst | | | Amount of residual monomer after polymerization (% based on the whole monomer) |
|---|---|---|---|---|
| | Kind | Amount (ppm based on the whole monomer) | Comonomer | |
| Comp. Ex. A-1 | phosphomolybdic acid | 3 | 1,3-dioxolane | 15* |
| Comp. Ex. A-2 | phosphomolybdic acid | 3 | 1,3-dioxolane | 2.5 |
| Comp. Ex. A-3 | boron trifluoride dibutyletherate | 40 (BF$_3$) | 1,3-dioxolane | 4.8 |

| | Deactivator solution | | Characteristic of extruded pellet | | |
|---|---|---|---|---|---|
| | Deactivator | Solvent (% of concentration of deactivator) | Addition amount (% based on crude polymer) | MI (g/10 min.) | Decomposition rate with alkali (%) | Weight-loss on heating (%) |
| Comp. Ex. A-1 | trimethylamine | water (20) | 1.5 | extrustion impossible | | |
| Comp. Ex. A-2 | trimethylamine | water (20) | 15 | extrustion impossible | | |
| Comp. Ex. A-3 | trimethylamine | water (20) | 1.5 | 16.5 | 1.56 | 0.63 |

*Polmerization time was shortened.

TABLE 3

| | Polymerization catalyst | | residual | Amount of monomer after polymerization (% based on the) whole monomer) |
|---|---|---|---|---|
| | Kind | Amount (ppm based on the whole monomer) | Comonomer | |
| Ex. B-1 | phosphomolybdic acid | 3 | 1,3-dioxolane | 2.5 |
| Ex. B-2 | phosphomolybdic acid | 3 | 1,3-dioxolane | 2.5 |
| Ex. B-3 | phosphomolybdic acid | 3 | 1,3-dioxolane | 2.5 |
| Ex. B-4 | phosphomolybdic acid | 3 | 1,3-dioxolane | 2.5 |
| Ex. B-5 | phosphomolybdic acid | 3 | 1,3-dioxolane | 2.5 |
| Ex. B-6 | phosphomolybdic acid | 3 | 1,3-dioxolane | 2.5 |
| Ex. B-7 | phosphomolybdic acid | 3 | 1,3-dioxolane | 2.5 |
| Ex. B-8 | phosphomolybdic acid | 3 | 1,3-dioxolane | 2.5 |
| Ex. B-9 | phosphomolybdic acid | 2 | 1,3-dioxolane | 4.8 |
| Ex. B-10 | silicotungstic acid | 3 | 1,3-dioxolane | 3.0 |
| Ex. B-11 | sillcomolybdic acid | 4 | 1,3-dioxolane | 2.0 |
| Ex. B-12 | phosphotungstic acid | 10 | 1,3-dioxolane | 5.0 |
| Ex. B-13 | phosphomolybdic acid | 3 | 1,4-butanediol formal | 2.8 |
| Ex. B-14 | phosphomolybdic acid | 3 | diethyleneglycol formal | 3.6 |

| | Basic gas | | Characteristic of extruded pellet | | |
|---|---|---|---|---|---|
| | Kind | Addition amount (% based on crude polymer) | MI (g/10 min.) | Decomposition rate with alkali (%) | Weight-loss on heating (%) |
| Ex. B-1 | ammonia | 0.1 | 6.8 | 0.41 | 0.25 |
| Ex. B-2 | ammonia (carrier gas: $N_2$) | 0.05 | 7.1 | 0.49 | 0.31 |
| Ex. B-3 | ammonia | 1.5 | 6.6 | 0.45 | 0.23 |
| Ex. B-4 | methylamine | 0.5 | 7.8 | 0.54 | 0.28 |
| Ex. B-5 | dimethylamine | 0.5 | 7.5 | 0.59 | 0.35 |
| Ex. B-6 | trimethylamine | 0.5 | 6.8 | 0.51 | 0.31 |
| Ex. B-7 | ethylamine | 0.5 | 7.3 | 0.60 | 0.40 |
| Ex. B-8 | triethylamine (carrier gas: $N_2$) | 0.5 | 8.2 | 0.63 | 0.55 |
| Ex. B-9 | ammonia | 0.1 | 6.9 | 0.52 | 0.27 |
| Ex. B-10 | ammonia | 0.1 | 6.8 | 0.49 | 0.34 |
| Ex. B-11 | ammonia | 0.1 | 7.3 | 0.58 | 0.35 |
| Ex. B-12 | ammonia | 0.1 | 8.9 | 0.72 | 0.44 |
| Ex. B-13 | ammonia | 0.1 | 7.0 | 0.53 | 0.29 |
| Ex. B-14 | ammonia | 0.1 | 7.5 | 0.55 | 0.27 |

TABLE 4

| | Polymerization catalyst | | | Amount of residual monomer after polymerization (% based on the) whole monomer) |
|---|---|---|---|---|
| | Kind | Amount (ppm based on the whole monomer) | Comonomer | |
| Comp. Ex. B-1 | boron triflouride dibutyletherate | 40 ($BF_3$) | 1,3-dioxolane | 2.5 |
| Comp. Ex. B-2 | boron triflouride dibutyletherate | 40 ($BF_3$) | 1,3-dioxolane | 2.5 |

| | Kind | Addition amount (% based on crude polymer) | MI (g/10 min.) | Decomposition rate with alkali (%) | Weight-loss on heating (%) |
|---|---|---|---|---|---|
| Comp. Ex. B-1 | ammonia | 0.1 | 18.2 | 1.73 | 0.75 |
| Comp. Ex. B-2 | trimethylamine | 0.5 | 16.2 | 1.54 | 0.71 |

Effect of the Invention

As described in the above and Examples, it is apparent that the present process comprises remarkably simplified steps without washing step comparing the conventional processes, and in which the polymerization catalyst can be completely deactivated, whereby the polyacetal copolymer having no problems such as decomposition originated from the catalyst or modification thereof, having a little unstable part to be stable can be obtained. Furthermore, by the present process, the polyacetal copolymer being excellent in qualities can be produced economically.

We claim:

1. A process for preparing a polyacetal copolymer comprising the steps of:
   (a) subjecting a reaction mixture comprised of trioxane as a principal monomer and a cyclic ether or cyclic formal having at least one carbon-carbon bond as a comonomer to copolymerization reaction conditions using a heteropoly-acid or an acidic salt thereof according to the following formula as a polymerization catalyst:

$$H_x[M_m \cdot M'_n O_l] \cdot yH_2O$$

wherein M represents an element selected from the group consisting of P and Si; M' represents a coordinating element selected from the group consisting of W, Mo and V; l is 10 to 100; m is 1 to 10; n is 6 to 40; x is an integer of at least 1; and y is 0 to 50;
   (b) after the remaining unreacted monomers are reduced to 10% by weight or less of all the monomers fed into the reaction mixture to thereby obtain a product mixture comprised of crude copolymer product, unreacted monomers and the polymerization catalyst, then treating the reaction mixture with a solution containing a deactivator for said polymerization catalyst in an amount of 0.01 to 10% by weight based on the resulting crude copolymer product to deactivate the catalyst therein; and then subsequently without washing the treated product mixture
   (c) subjecting the crude copolymer product to a melting treatment.

2. The process of claim 1, wherein said comonomer is at least one member selected from the group consisting of 1,3-dioxolane, diethylene glycol formal and 1,4-butanediol formal and ethylene oxide.

3. The process of claim 1, wherein said heteropoly-acid is selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

4. The process of claim 1, wherein step (b) includes treating the product mixture with an aqueous solution or organic solvent solution which comprises at least one compound selected from the group consisting of ammonia, amine compounds, trivalent phosphorus compounds, and oxides, hydroxides, inorganic salts and organic acid salts of alkali metals and alkaline earth metals.

5. The process of claim 1, wherein step (b) includes pulverizing the crude copolymer after copolymerization into particles at least 90% of which have a particle diameter of 3 mm or less.

6. The process of claim 1, wherein step (c) is practiced so as to form said melt in the presence of a stabilizer.

7. A process for preparing a polyacetal copolymer comprising the steps of:
   (a) subjecting a reaction mixture comprised of trioxane as a principal monomer and a cyclic ether or cyclic formal having at least one carbon-carbon bond as a comonomer to copolymerization reaction conditions using a heteropoly-acid or an acidic salt thereof according to the following formula as a polymerization catalyst:

$$H_x[M_m \cdot M'_n O_l] \cdot yH_2O$$

wherein M represents an element selected from the group consisting of P and Si; M' represents a coordinating element selected from the group consisting of W, Mo and V; l is 10 to 100; m is 1 to 10; n is 6 to 40; x is an integer of at least 1; and y is 0 to 50;
   (b) after the remaining unreacted monomers are reduced to 10% by weight or less of all the monomers fed into the reaction mixture to thereby obtain a product mixture comprised of crude copolymer product, unreacted polymerization catalyst, the treating the reaction mixture by contact with a basic gas as a deactivating agent to deactivate the catalyst therein; and then subsequently without washing the treated product mixture
   (c) subjecting the crude copolymer product to a melting treatment.

8. The process of claim 7, wherein said comonomer is at least one member selected from the group consisting of 1,3-dioxolane, diethylene glycol formal and 1, 4-butanediol formal and ethylene oxide.

9. The process of claim 7, wherein said heteropoly-acid is selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

10. The process of claim 7, wherein the basic gas is ammonia.

11. The process of claims 7, wherein the basic gas is an amine compound.

12. The process of claim 11, wherein the amine compound is represented by at least one of the formulas $R_1NH_2$, $R_1R_2NH$ or $R_1R_2R_3N$, in which $R_1$, $R_2$ and $R_3$ each represents an alkyl or alcoholic group having four or less carbon atoms.

13. The process as in claim 7, wherein step (b) is practiced by bringing the basic gas into contact directly with the crude copolymer product.

14. The process as in claim 7, wherein step (b) is practiced by mixing the basic gas with a carrier gas to form a mixed gas, and then bringing the mixed gas into contact with the crude copolymer product.

15. The process as in claim 7, wherein step (b) includes pulverizing the crude copolymer after copolymerization into particles at least 90% of which have a particle diameter of 3 mm or less.

16. The process of claim 7, wherein step (c) is practiced so as to form said melt in the presence of a stabilizer.

* * * * *